United States Patent Office 2,737,150
Patented Mar. 6, 1956

2,737,150

WELDING ELECTRODE AND METHOD

Charles T. Gayley, Lansdowne, Pa.

No Drawing. Application May 4, 1951,
Serial No. 224,651

3 Claims. (Cl. 118—205)

(Granted under Title 35, U. S. Code (1952), sec. 266)

The invention described herein may be manufactured and used by or for the Government of the United States of America for governmental purposes without the payment of any royalties thereon or therefor.

The present invention concerns an arc-welding electrode having a coating including a small amount of zinc oxide. In particular, the invention concerns an arc-welding electrode of the low-hydrogen type having a coating thereon formed by extrusion and with the coating including zinc oxide in an amount no more than 5%.

In the manufacture of arc-welding electrodes that have a coating formed thereon by extrusion, it is necessary to control the plasticity of the coating material in order to control wear on the extrusion dies and to control the rate of speed at which extrusion can be performed. Conventional plasticisers for this purpose are represented by material such as clay, asbestos or talc. However, these materials contain water of crystallization, a source of hydrogen, and are therefore unsuitable in the coating for a low-hydrogen electrode.

I have discovered that the use of zinc oxide in the coating when used in small amounts, preferably no more than 5%, serves as an excellent plasticiser. The zinc oxide does not carry water of crystallization and therefore is suitable for use in the coating of a low-hydrogen electrode.

An object of the invention is to provide an arc-welding electrode having a coating that includes a small amount of zinc oxide.

Another object of the invention is to provide an arc-welding electrode of the low-hydrogen type having a coating that is formed thereon by extrusion with the coating including a small amount of zinc oxide and preferably no more than 5%.

A further object of the invention is to provide a novel method for extruding a coating on a welding electrode.

A further object of the invention is to provide a novel method of extruding a coating on a weld rod.

Other objects and many of the attendant advantages of this invention will be readily appreciated as the same becomes better understood by reference to the following detailed description.

The electrode of the present invention is in the form of a short length of metal rod or wire to which the coating is applied by extrusion. The coating contains conventional fluxing material, deoxidizing and low-hydrogen material, slag-forming material, and a binder to cause these materials to adhere together and to the rod. Conventional materials in conventional proportions are used.

In addition to these materials there is used a small amount of zinc oxide as a plasticiser, and I have found that no more than 5%, and preferably no more than 3% is a desirable amount.

The solid ingredients, including the zinc oxide, preferably in powdered form, are mixed dry and then thoroughly mixed with the binder, which preferably is in liquid form. Some water may be added if desired to obtain an optimum consistency but this is optional. If desired, the binder, such as sodium silicate and potassium silicate, can be added in solid form, but in that case water is added to produce the solution. Although the zinc oxide is preferably mixed together with the other powdered dry ingredients, the zinc oxide can, if desired, be added after the other dry powdered ingredients are mixed with the liquid binder.

Specific examples of coating compositions that can be formulated in the above manner are as follows:

*Example I*

| | Percent |
|---|---|
| Marble flour | 25 |
| Fluorspar | 21.8 |
| Titania | 5 |
| Calcium silicate | 5 |
| Zinc oxide | 5 |
| Lithium pentaborate | 1.2 |
| Ferro-silicon | 5 |
| Manganese, powdered | 6 |
| Nickel, powdered | 8 |
| Ferro-molybdenum | 3 |
| Sodium silicate | 4.4 |
| Potassium silicate | 10.6 |

*Example II*

| | Percent |
|---|---|
| Marble flour | 3 |
| Feldspar | 25 |
| Calcium silicate | 6 |
| Zinc oxide | 5 |
| Asbestos | 1.2 |
| Manganese dioxide | 14 |
| Alpha cellulose | 3 |
| Ferro-silicon | 8 |
| Manganese, powdered | 4 |
| Sodium silicate | 20 |

*Example III*

| | Percent |
|---|---|
| Titania | 15 |
| Feldspar | 3 |
| Zinc oxide | 5 |
| Asbestos | 19 |
| Alpha cellulose | 27 |
| Ferro-silicon | 4 |
| Manganese, powdered | 4 |
| Sodium silicate | 23 |

The use of zinc oxide in the electrode coating when mixed with the other dry ingredients before the addition of liquid binder, reduces the time required to mix the coating batch. Also the zinc oxide reduces wear in extrusion dies and permits the extrusion of electrodes at a high rate of speed. A further advantage is that the zinc oxide permits the coating to be extruded sufficiently hard so that it can be handled without marking or scoring in subsequent operations.

Obviously many modifications and variations of the present invention are possible in the light of the above teachings. It is therefore to be understood that within the scope of the appended claims the invention may be practiced otherwise than as specifically described.

I claim:

1. An arc welding electrode of the low-hydrogen type comprising a metallic rod having a coating comprising

| | Percent |
|---|---|
| Marble flour | 25 |
| Fluospar | 21.8 |
| Titania | 5 |
| Calcium silicate | 5 |
| Zinc oxide | 5 |
| Lithium pentaborate | 1.2 |
| Ferro-silicon | 5 |
| Manganese, powdered | 6 |
| Nickel, powdered | 8 |
| Ferro-molybdenum | 3 |
| Sodium silicate | 4.4 |
| Potassium silicate | 10.6 |

2. An arc welding electrode mineral comprising a metallic rod having a coating comprising

| | Percent |
|---|---|
| Marble flour | 3 |
| Feldspar | 25 |
| Calicum silicate | 6 |
| Zinc oxide | 5 |
| Asbestos | 1.2 |
| Manganese dioxide | 14 |
| Alpha cellulose | 3 |
| Ferro-silicon | 8 |
| Manganese, powdered | 4 |
| Sodium silicate | 20 |

3. An arc welding electrode cellulosic comprising a metallic rod having a coating comprising

| | Percent |
|---|---|
| Titania | 15 |
| Feldspar | 3 |
| Zinc oxide | 5 |
| Asbestos | 19 |
| Alpha cellulose | 27 |
| Ferro-silicon | 4 |
| Manganese, powdered | 4 |
| Sodium silicate | 23 |

References Cited in the file of this patent

UNITED STATES PATENTS

| 1,754,116 | Meunier | Apr. 8, 1930 |
| 1,814,878 | Weed | July 14, 1931 |
| 1,880,545 | Waldman | Oct. 4, 1932 |
| 1,936,349 | Castle | Nov. 21, 1933 |
| 2,370,100 | White | Feb. 20, 1945 |
| 2,408,620 | Friedlander | Oct. 1, 1946 |
| 2,410,850 | Wasserman | Nov. 12, 1946 |